United States Patent [19]

Gass et al.

[11] Patent Number: 5,208,807
[45] Date of Patent: May 4, 1993

[54] DATA TRANSMISSION METHOD EMPLOYING A SYNCHRONOUS FRAME COMBINING ASYNCHRONOUS CELLS WITH ISOCHRONOUS CHANNELS

[75] Inventors: Raymond Gass, Erstein; Christine Cordonnier, Wolfisheim, both of France

[73] Assignee: Alcatel Business Systems, Paris, France

[21] Appl. No.: 643,258

[22] Filed: Jan. 22, 1991

[30] Foreign Application Priority Data

Jan. 22, 1990 [FR] France .................................. 90 00705

[51] Int. Cl.⁵ ............................................. H04L 5/22
[52] U.S. Cl. ..................................... 370/60.1; 370/97.2
[58] Field of Search ...................... 370/82, 85.7, 84, 91, 370/94.2, 95.1, 105.1, 110.1, 100.1, 60, 60.1, 94.1

[56] References Cited

U.S. PATENT DOCUMENTS

| | | | |
|---|---|---|---|
| 4,298,978 | 11/1981 | Nakamura | 370/82 |
| 4,367,549 | 1/1983 | Vachee | 370/91 |
| 4,413,338 | 11/1983 | Renoulin | 370/105 |
| 4,482,999 | 11/1984 | Janson | 370/60 |
| 4,519,068 | 5/1988 | Krebs | 370/82 |
| 4,761,781 | 8/1988 | Calvignac et al. | 370/94.2 |
| 4,862,453 | 8/1989 | West | 370/82 |
| 4,926,420 | 5/1990 | Shimizu | 370/82 |
| 4,949,232 | 1/1985 | Dambrackas | 370/118 |
| 5,040,174 | 8/1991 | Takeuchi | 370/100.1 |
| 5,051,988 | 9/1991 | Kawahigashi | 370/110.1 |

FOREIGN PATENT DOCUMENTS 0214352 3/1987 European Pat. Off. .

OTHER PUBLICATIONS

IBM Technical Bulletin, vol. 29, No. 12, May 1987, pp. 5225–5228, New York, USA; N.N.: "Dynamic Slot Assignment in TDM Frames".

Primary Examiner—Douglas W. Olms
Assistant Examiner—Melvin Marcelo
Attorney, Agent, or Firm—Sughrue, Mion, Zinn, Macpeak & Seas

[57] ABSTRACT

In a data transmission method employing a synchronous frame combining asynchronous cells with isochronous channels, a first channel of each frame is reserved for control data independent of the data to be transmitted. Second channels of each frame in a multiframe are reserved for path service data divided between a first group of a specific number of the second channels having specific channel numbers reserved for asynchronous data cell service octets and a second group of second channels which specify the number of isochronous data channels used during the frame of which each forms part. The third channel of each successive frame is at least partially reserved for a code defining a cell start channel number for any cell in the frame in question.

4 Claims, 3 Drawing Sheets

FIG. 1

| FRAME \ TIME SLOT (TS) | TS0 | TS1 | TS2 | TS3 ... TS31 |
|---|---|---|---|---|
| T0 | TS 0 | B1 | C.B | |
| T1 | TS 0 | iso | C.B | |
| T2 | TS 0 | iso | C.B | |
| T3 | TS 0 | G1 | C.B | |
| T4 | TS 0 | iso | C.B | |
| T5 | TS 0 | iso | C.B | |
| T6 | TS 0 | F1 | C.B | |
| T7 | TS 0 | iso | C.B | |
| T8 | TS 0 | iso | C.B | |
| T9 | TS 0 | M1 | C.B | |
| T10 | TS 0 | iso | C.B | |
| T11 | TS 0 | iso | C.B | |
| T12 | TS 0 | M2 | C.B | |
| T13 | TS 0 | iso | C.B | |
| T14 | TS 0 | iso | C.B | |
| T15 | TS 0 | Z1 | C.B | |

↑ FIRST CHANNEL
↑ SECOND CHANNEL

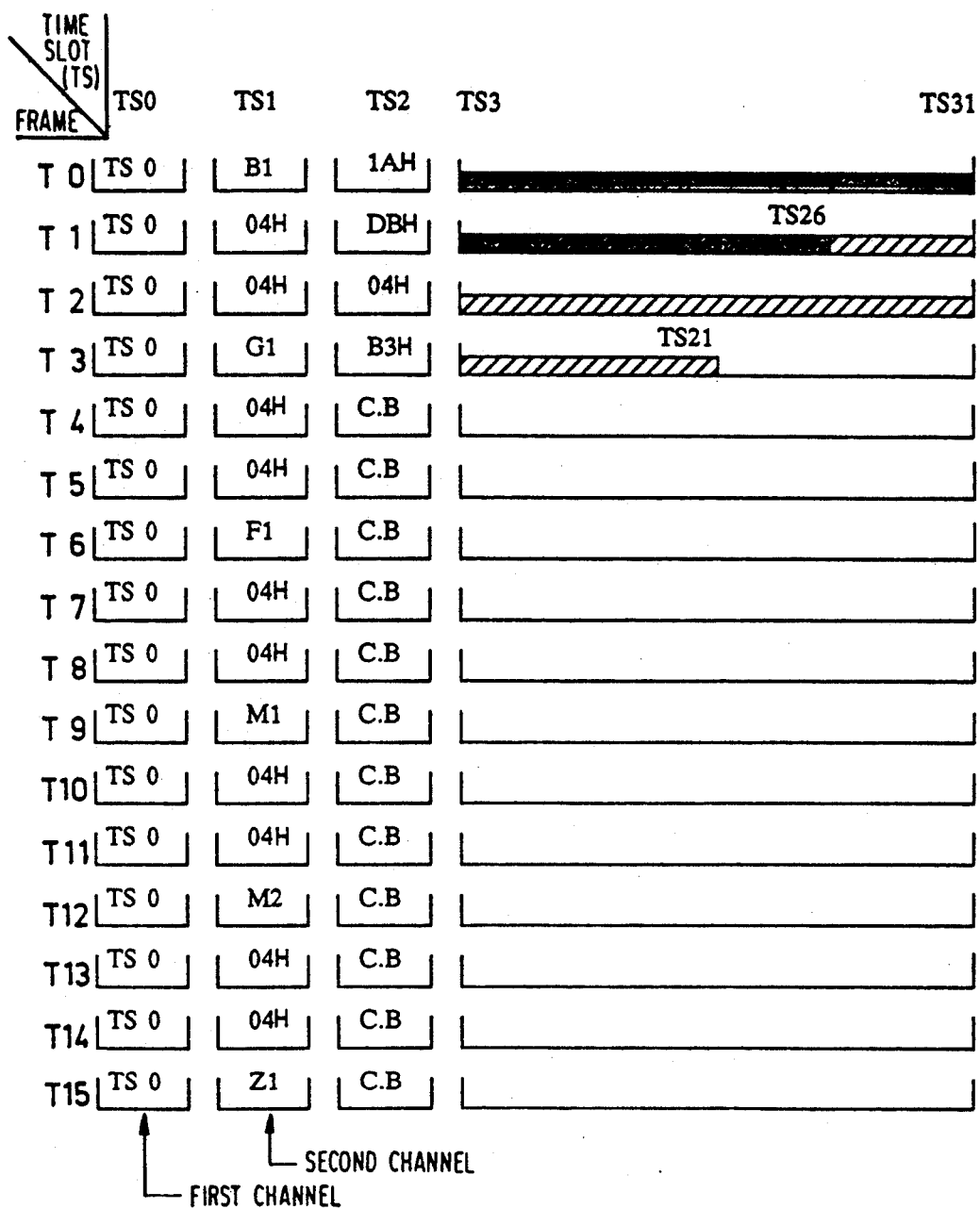

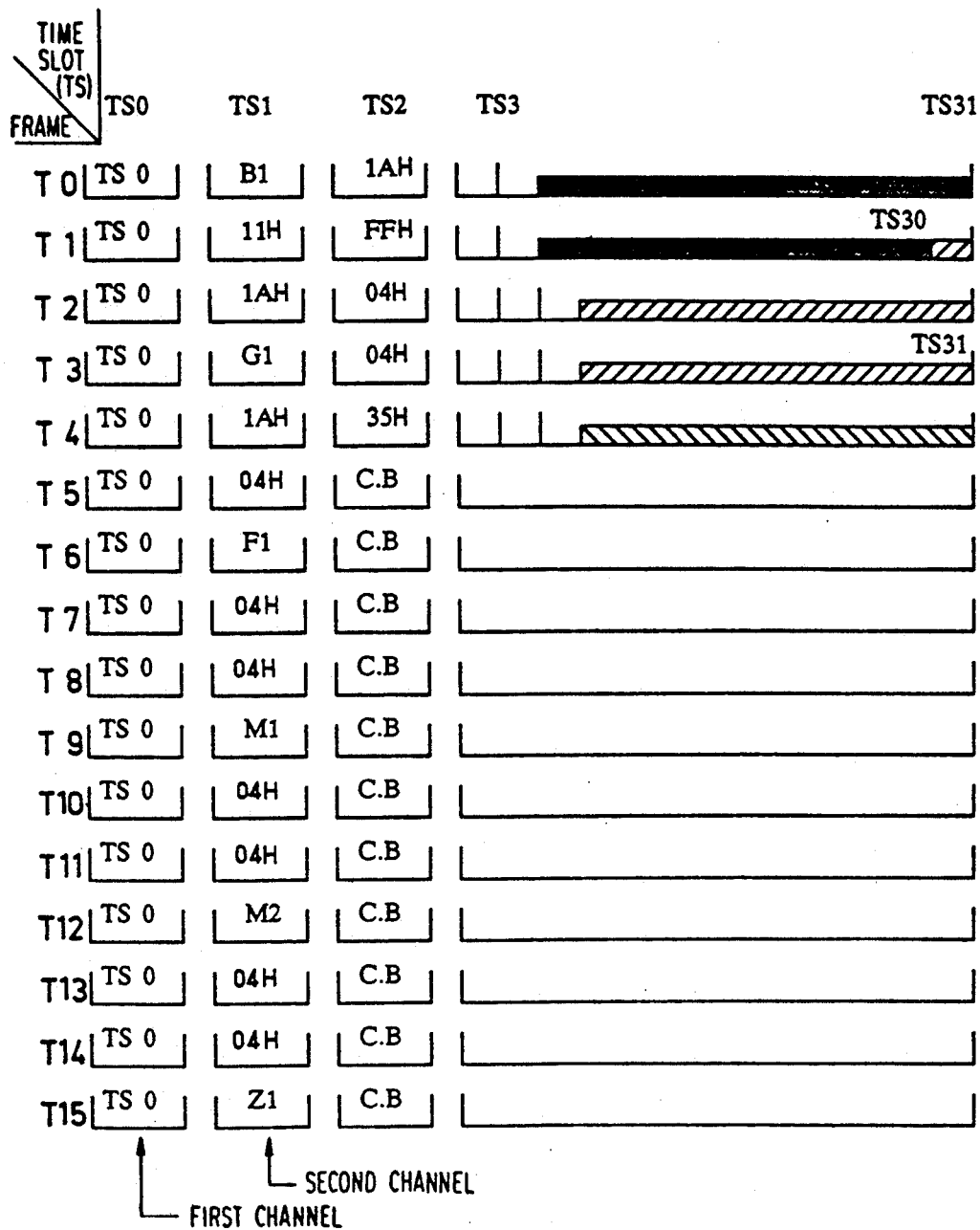

DATA TRANSMISSION METHOD EMPLOYING A SYNCHRONOUS FRAME COMBINING ASYNCHRONOUS CELLS WITH ISOCHRONOUS CHANNELS

BACKGROUND OF THE INVENTION

1. Field of the invention

The invention concerns a data transmission method employing a synchronous frame combining asynchronous cells with isochronous channels on a time-division multiplex interface for which the basic frame represents a primary bit rate of 2.048 Mbit/s.

2. Description of the related art

CCITT Recommendation G.704 defines various synchronous frame structures for transferring digital signals in the form of octets.

The frame defined by Recommendation G.704 for 2.084 Mbit/s bit rate interfaces provides 32 isochronous channels each associated with a numbered time slot in each of the successive frames, the period of the frames being 125 µs.

The consecutive frames are grouped into multiframes each comprising sixteen frames and some channels, including the first (No. 0) channel and in some cases the fifteenth (No. 16) channel can be divided into lower rate channels, used in particular to transmit frame and multiframe alignment bits or signalling if necessary.

Isochronous channels (e.g., channels separated by fixed intervals) are reserved during frames if at least some of the octets to be transmitted represent signals transmitted from primary PCM multiplex equipment as defined by CCITT Recommendation G.732, enabling the transmission of sampled and encoded voice signals in the form of octets. A 64 kbit/s channel can then transmit encoded signals relating to one direction of a call set up between two telephone sets, for example.

Channels are also reserved during frames if at least some of the octets to be transmitted are originated by equipment for multiplexing digital data formed into packets and specifically into cells according to the IEEE standard 802.6.

These cells are designed for asynchronous transmission of data packets with a fixed length of 53 octets, divided between five service octets at the start of the cell and 48 octets for the data to be transmitted.

Under some operating conditions it may be advantageous to transmit simultaneously synchronous channel and isochronous cell octets, for example to avoid the use of two links respectively assigned to the channels and to the cells, provided that the respective bit rates authorize simultaneous transmission on a single link, and subject to the availability of an appropriate organization.

SUMMARY OF THE INVENTION

The present invention consists in a transmission method employing a synchronous frame combining asynchronous cells with isochronous channels on a time-division multiplex interface by means of which data is transmitted during successive multiframes each comprising the same number of frames, said successive frames each being made up of the same number of time slots and time slots with the same number in successive frames constituting an octet-oriented data transmission channel, a first channel of each frame being reserved for management data that is independent of the data to be transmitted, in which method second channels of each frame in a multiframe are reserved for path service data, said data being divided between a first group of a specific number of second channels having specific channel numbers and reserved for asynchronous data cell service octets and a second group of second channels the number of which is at the most equal to the difference between the total number of channels available per frame and the number of channels of the first group, which second channels of said second group are reserved for indicating the number of isochronous data channels used during the frame of which each constitutes a part and optionally during the next frame if the second channel thereof is a second channel of the first group, and the third channel of each successive frame being at least partially reserved for a code defining a start-of-cell channel number for every cell in the frame in question, said third channels corresponding to time slots immediately succeeding time slots of the second channels immediately succeeding those of the first channels during successive frames.

The invention, its characteristics and advantages will now be described with reference to the figures listed below.

BRIEF DESCRIPTION OF THE DRAWINGS

FIG. 1 shows a multiframe structure in accordance with the invention.

FIG. 2 shows a multiframe organization obtained in the absence of isochronous channel octets.

FIG. 3 shows a multiframe organization obtained in the simultaneous presence of isochronous channel and asynchronous cell octets.

DETAILED DESCRIPTION OF THE INVENTION

As explained above, the basic frame and multiframe structure defined by CCITT Recommendation G.704 provides a frame supporting 32 channels and a superframe comprising 16 consecutive frames, the duration of each frame being 125 µs.

The first channel TS0 of each frame corresponds to the identically referenced time slot TS0 for each of the frames T0 through T15 of a multiframe as shown in FIG. 1. It is reserved for the transmission of bits relating to frame and multiframe alignment data, to cyclic redundancy check (CRC) data, to remote alarm indications and to spare bits, the whole being configured in a known manner as specified in the above-mentioned recommendation.

The second and third channels TS1 and TS2 of each frame are reserved for path service data relating to the asynchronous cells transmitted and to the isochronous channels temporarily associated with said cells during the transmission phase in question.

In one embodiment, the second channel TS1 of one frame in three of the multiframes is reserved for asynchronous cell path octets and the third channels TS2 of all the frames are reserved for asynchronous cell start indications.

In the case of cells to the IEEE 802.6 standard, the second channel TS1 of the first frame T0 of each multiframe is, for example, reserved for the transmission of an interleaved bit parity octet B1, the second channel TS1 of the fourth frame T3 is reserved for a cell path state isochronous octet G1, and the second channel TS1 of the seventh frame T6 is reserved for a cell user channel isochronous octet F1. Likewise the channels TS1 of the tenth and thirteenth frames T9 and T12 are respectively reserved for two asynchronous cell layer management data octets M1 and M2, as provided by the above-mentioned standard.

The second channels TS1 of the other frames of a multiframe, except for the last frame T15, are assigned to the transmission of octets denoted iso in the figures and relating to the number of isochronous octets transmitted, each second channel TS1 of said other frames specifying the number of isochronous octets transmitted by the frame comprising it and possibly by the next frame if the latter is one of the frames T0, T3, T6, T9, T12, T15 containing further data.

The second channel TS1 of the last frame T15 of a multiframe is reserved for future use and transmits an octet Z1 of no significance.

Five bits are sufficient for transmitting the number of isochronous octets that can be included in a frame as this number is necessarily less than 29.

Having reserved five bits of each octet of the second channels TS1 containing a number of isochronous octets indication, in order to transmit said indication, it is possible to use the remaining three bits of an octet for a parity check on the bits constituting the indication on five bits included in said octet. The table below shows one example of an arrangement of this kind in which the sixth bit represents the odd parity of bits 1 through 4 of an octet and the seventh bit represents the odd parity of bits 3 through 6, a characteristic indication of cell continuation with no change being present if there are no isochronous octets in a frame.

| Number of isochronous octets | Cell start address | Code |
|---|---|---|
| 0 | COC | 04H |
| 1 | — | 0FH |
| 2 | — | 11H |
| 3 | 3 | 1AH |
| 4 | 4 | 20H |
| 5 | 5 | 2BH |
| 6 | 6 | 35H |
| 7 | 7 | 3EH |
| 8 | 8 | 43H |
| 9 | 9 | 48H |
| 10 | 10 | 56H |
| 11 | 11 | 5DH |
| 12 | 12 | 67H |
| 13 | 13 | 6CH |
| 14 | 14 | 72H |
| 15 | 15 | 79H |
| 16 | 16 | 82H |
| 17 | 17 | 89H |
| 18 | 18 | 97H |
| 19 | 19 | 9CH |
| 20 | 20 | A6H |
| 21 | 21 | ADH |
| 22 | 22 | B3H |
| 23 | 23 | B8H |
| 24 | 24 | C5H |
| 25 | 25 | CEH |
| 26 | 26 | D0H |
| 27 | 27 | DBH |
| 28 | 28 | E1H |
| 29 | 29 | E4H |
| — | 30 | F4H |
| — | 31 | FFH |

The remaining 29 channels of each frame are used to transmit data octets, FIGS. 2 and 3 showing two examples in which only the content of the first frames is represented.

As mentioned above, the first channel TS0 of each frame of a multiframe includes an octet as specified in Recommendation G.704 which is not modified by the method in accordance with the invention.

The second channels of the frames T0, T3, T6, T9, T12 and T15 respectively contain the octets B1, G1, F1, M1, M2 and Z1 defined above.

The second channels of the other frames contain an indication representing a null number of isochronous channels, which is the code 04H (see above table) when no isochronous channel is needed, as shown in FIG. 2. In all other cases they contain a code representing the number of isochronous channels in the frame in which they are included. Thus the second channels TS1 of the second frame T1 and of the third frame T2 shown in FIG. 3 respectively contain the codes 11H and 1AH characterizing the presence of two isochronous channels in frame T1 and three isochronous channels in frame T2.

These isochronous channels are transmitted immediately after the three channels TS0, TS1, TS2 in the frames which include them, as symbolically represented by the presence of respectively two and three pulses in FIG. 3 after the pulse representing the channel TS2.

The third channels TS2 of frames T0 through T3 shown in FIG. 2 each contain, as already explained, the code of the initial channel of the cell which starts there, for example the code 1AH characterizing a channel TS3 (No. 4) for the frame T0 and the code DBH characterizing a channel TS27 (No. 28) for the new cell shown shaded in FIG. 2, and so on. The extension of said new cell over all the usable channels TS3 through TS31 of the frame T2 (No. 3) is therefore represented by the presence of a code 04H in channel TS1 of said frame.

The same applies, of course, to the examples given in FIG. 3, the asynchronous cell octets being placed during successive frames in the channels following any which contain isochronous octets.

There is claimed:

1. A data transmission method employing a synchronous multiframe associating asynchronous cells and synchronous data octets to isochronous channels on a time-division multiplex link to transmit data during successive multi-frames, each multiframe comprising a plurality of numbered frames, said frames each being made up of a plurality of time slots and the time slots identically numbered in successive frames constituting an isochronous and octet-oriented data transmission channel, said method comprising the steps of:

reserving a first time slot of each frame for management data that are independent of the data to be transmitted, reserving a second time slot of each frame for path service data, said path service data being divided according to the frame numbers, between a first group of the second time slots, having specific frame numbers, which are reserved for asynchronous data cell service octets, and a second group of the second time slots, each time slot of the second group of the second time slots being reserved from data indicating the number of time slots to be used for synchronous transmission during the frame corresponding thereto and optionally during the next frame if the second time slot thereof is a second time slot of the first group, and reserving a third time slot of each frame for a code defining a start-of-cell time slot number when a cell begins in the frame, the first, second and third time slots of the same frame being immediately successive to one another.

2. A method according to claim 1 wherein the time slots successively succeeding the first three time slots during a frame are assigned to the isochronous data channels needed for synchronous transmission during the frame in question, the subsequent time slots in the frame being used for asynchronous transmission of data cell octets.

3. A method according to claim 1 wherein each third time slot also includes a parity check indication associated with a code contained therein.

4. A method according to claim 1 wherein said multiframes comprise sixteen frames, said frames comprise thirty-two time slots and the asynchronous data cells comprise five cell service octets, the five time slots needed for transmission of the cell service octets during a multiframe are distributed every three frames in the second time slots of said frames starting from the first frame of said multiframe, each of the remaining second time slots of said multiframes being assigned to indicate the number of isochronous data channels in the frame that carries them.

* * * * *